United States Patent [19]
Brincks et al.

[11] Patent Number: 5,752,800
[45] Date of Patent: May 19, 1998

[54] COMBINATION PICKUP TRUCK BED EXTENDER-FOLDABLE RAMP

[76] Inventors: Darryl Brincks; Deanne Short, both of 2120 Rivera Dr.. Peoria, Ill. 61614

[21] Appl. No.: 914,011

[22] Filed: Jul. 31, 1997

[51] Int. Cl.$^6$ ........................................ B60P 1/00
[52] U.S. Cl. ................ 414/537; 296/57.1; 296/26; 296/61; 296/51
[58] Field of Search .................. 414/537, 538, 414/462; 296/50, 51, 57.1, 61, 26; 14/71.1, 72.5, 6.95

[56] References Cited

U.S. PATENT DOCUMENTS

| | | | |
|---|---|---|---|
| 3,642,156 | 2/1972 | Stenson | 414/537 |
| 4,068,770 | 1/1978 | Boehringer | 414/537 |
| 4,472,639 | 9/1984 | Bianchi | 296/57.1 X |
| 4,571,144 | 2/1986 | Guidry et al. | 414/537 |
| 5,154,470 | 10/1992 | Bringman, Jr. | 296/57.1 X |
| 5,697,754 | 12/1997 | Raymer | 414/537 |

FOREIGN PATENT DOCUMENTS

| | | | |
|---|---|---|---|
| 810469 | 8/1951 | Germany | 414/537 |
| 943214 | 5/1956 | Germany | 296/57.1 |

*Primary Examiner*—Frank E. Werner
*Attorney, Agent, or Firm*—Anthony A. Davis

[57] ABSTRACT

A pick-up truck ramp/bed extender adapted to be mounted upon inside bed surface of a tailgate. The ramp/bed extender is comprised of collapsible sections which, when fully extended and supported by supplementary rigid structures, provide a quick, convenient, and sturdy loading surface whereupon small machinery such as motorcycles, lawnmowers and snow mobiles may be loaded into the truck bed with little effort. The ramp/bed extender may be transported in two different positions. In the first transport position the ramp/bed extender is fully collapsed and secured against the inside bed surface of the closed tailgate. While in this position, the tailgate may be operated in the same manner as if the ramp/bed extender were not present. In the second transport position, the tailgate is lowered to the opened position with the ramp/bed extender forming a substantially enclosed structure thereby containing the items disposed in the now enlarged cargo area of the truck bed.

7 Claims, 7 Drawing Sheets

5,752,800

1

COMBINATION PICKUP TRUCK BED EXTENDER-FOLDABLE RAMP

BACKGROUND OF THE INVENTION

I. Field of the Invention

This invention relates, in general, to pick-up truck bed extenders and loading ramps to facilitate the easy loading and unloading of small mobile implements such as motorcycles, lawn tractors, snow mobiles and the like.

II. Description of the Prior Art

In the past there has been much development in the field of truck accessories specifically in the area of tailgate design. There have been many types of tailgate designs which incorporate ramp structures. None of these prior patents are believed to disclose, either singly or in combination, the applicant's unique invention.

It is well known in the prior art to utilize multiple hinged folding sections in the construction of a loading ramp. This foldable design is first taught in U.S. Pat. No. 3,352,440 issued to Wilson dated Nov. 14, 1967. Wilson discloses a loading ramp that is attached to the tail gate of a pickup truck, the ramp being hinged midway along its length for folding over on itself when being stored. This ramp is unlike the applicant's ramp in that when stored (with a load in the truck bed) one hinged section of the ramp is stored in an upright position (with respect to the horizontal truck bed surface) on the outside of the tailgate while the attached portion is stored in an upright position on the inside of the truck bed and tailgate.

U.S. Pat. No. 3,713,553 issued to Curtis discloses a ramp that attaches to the tailgate. The foldable sections of this ramp are stored on the outside of the tailgate when in the transport position. Because of the step which was created between the foldable portion closest in proximity to the tailgate (14) and the tailgate attachment portion (11), loading and unloading items into and out of the truck bed was difficult.

U.S. Pat. No. 3,642,156 issued to Stenson discloses a ramp that attaches to the original tailgate. This ramp is unlike applicant's ramp in that is comprised of increasingly narrower folding sections which make the ramp unacceptable for loading devices which have a width substantially the same as the inner cargo area of the truck bed.

U.S. Pat. No. 4,864,673 issued to Adaway discloses a foldable ramp which replaces the tailgate in its entirety. When not in use, the ramp is collapsed and stored within a modified tailgate. This ramp is different from applicant's device in that it cannot be easily detached from the vehicle unless the entire tailgate structure is removed therefrom.

U.S. Pat. No. 4,795,304 issued to Dudley discloses a ramp that attaches to a bumper. It is not an integral part of the truck bed tailgate.

None of the previously discussed prior art patents disclose integral side bed extender plates as taught in applicant's invention.

SUMMARY OF THE INVENTION

There is disclosed herein a foldable truck ramp which also functions as a truck bed extender. The present invention attaches to the factory provided tailgate. Applicant's invention may be transported in two different positions.

When use of the bed extender is not desired, the ramp is stored in the first transport position. In this position the ramp

2 is folded and secured to the inner surface of the factory provided tailgate by a conventional bolt which travels through aligned holes in the folded ramp into a receiving nut affixed to the tailgate plate (the rigid ramp member which is secured to the tailgate) thereby clamping and securing the folded ramp to the tailgate. This locking mechanism prevents accidental unfolding of the ramp and also lessens vibrational and wind noise occurring during transit. By removing the bolt, the ramp may be extended after the tailgate is lowered to the horizontal (opened) position. With the ramp secured in the first transport position the tailgate can be operated in the same manner as if the ramp were not connected thereto. When use of the truck bed extender is desired, the ramp is stored in the second transport position. With the tailgate in the opened position, the ramp is once again folded and rotated about it's attachment point axis to an vertical position in relationship to the truck bed. At this point, the integral side bed extenders which are hingably mounted upon the ramp are swung to a position which is substantially parallel with the side panels which comprise the truck bed. In conjunction with the tailgate/ramp assembly, the side bed extenders form a seal thereby containing the cargo within the truck bed thereby creating an effective low-cost device for enlarging the volumetric capacity of the truck bed.

Due to the lightweight materials used in the construction of the ramp, two or more ramp support members are positioned under the ramp, before it is extended to its operational loading position, substantially on each side of the ramp to evenly support the weight placed thereupon.

Accordingly, it is one object of the present invention to provide a folding ramp/truck bed extender that can be easily attached to the factory supplied tailgate.

It another object of the invention to provide a folding ramp/truck bed extender that is compact lightweight and is capable of being stored substantially within the truck bed (low visibility from outside of the truck bed)

It is still another object of the invention to provide a folding ramp/truck bed extender which can be stored in two transport positions depending on whether or not the use of the truck bed extender is desired.

These and other objects of the present invention will become readily apparent upon further review of the attached specification and drawings.

BRIEF DESCRIPTION OF THE DRAWINGS

The various features, advantages and other uses of the present invention will become more apparent by the following detailed description and drawing in which.

DESCRIPTION OF THE PREFERRED EMBODIMENT

Figure 1:
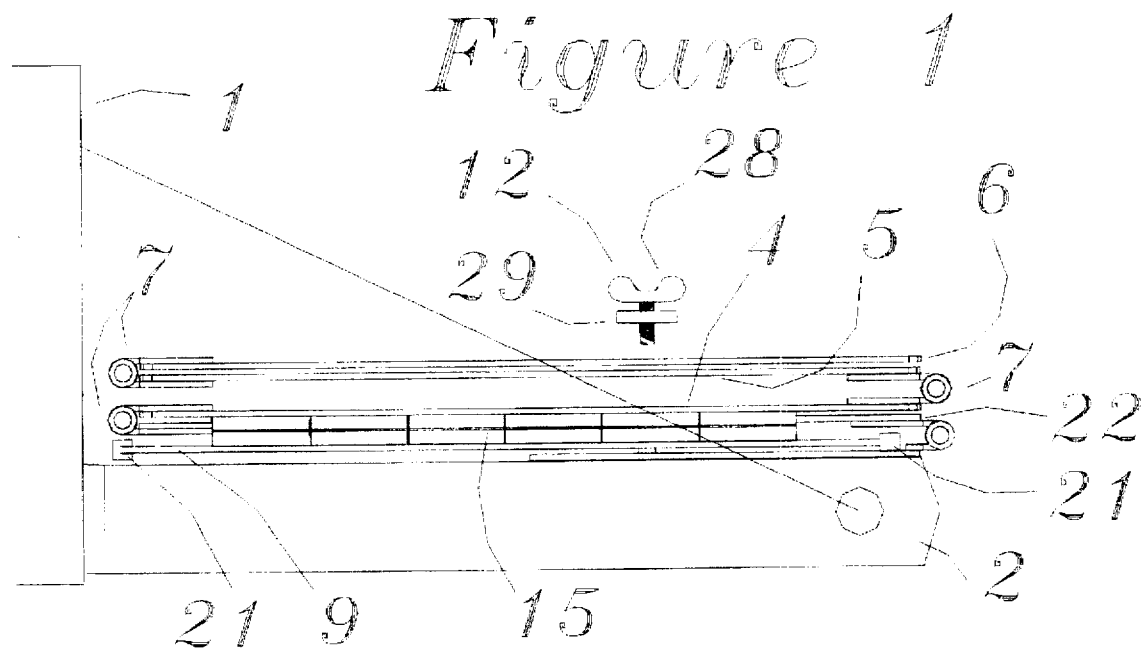
FIG. 1 is a side view of the ramp/truck bed extender in its unsecured state with the tailgate in the open position.

Throughout the following description and drawing, an identical reference number is used to refer to the same component shown in multiple figures of the drawing.

Figure 2:
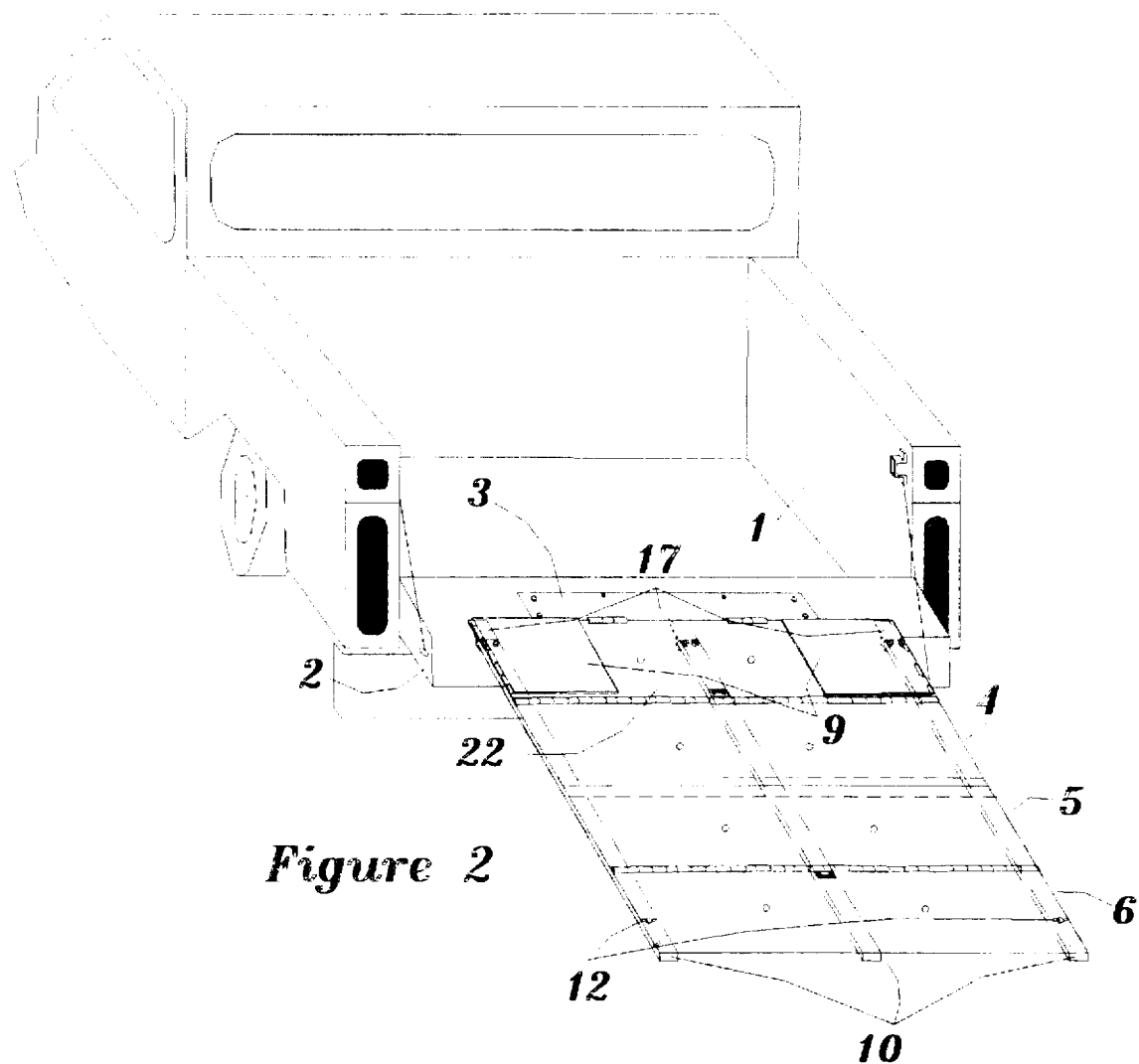
FIG. 2 is a of the back of a truck bed with the ramp/truck bed extender in the loading position except for the side bed extender plates which have not yet been extended (shown in FIG. 7)
Figure 4:
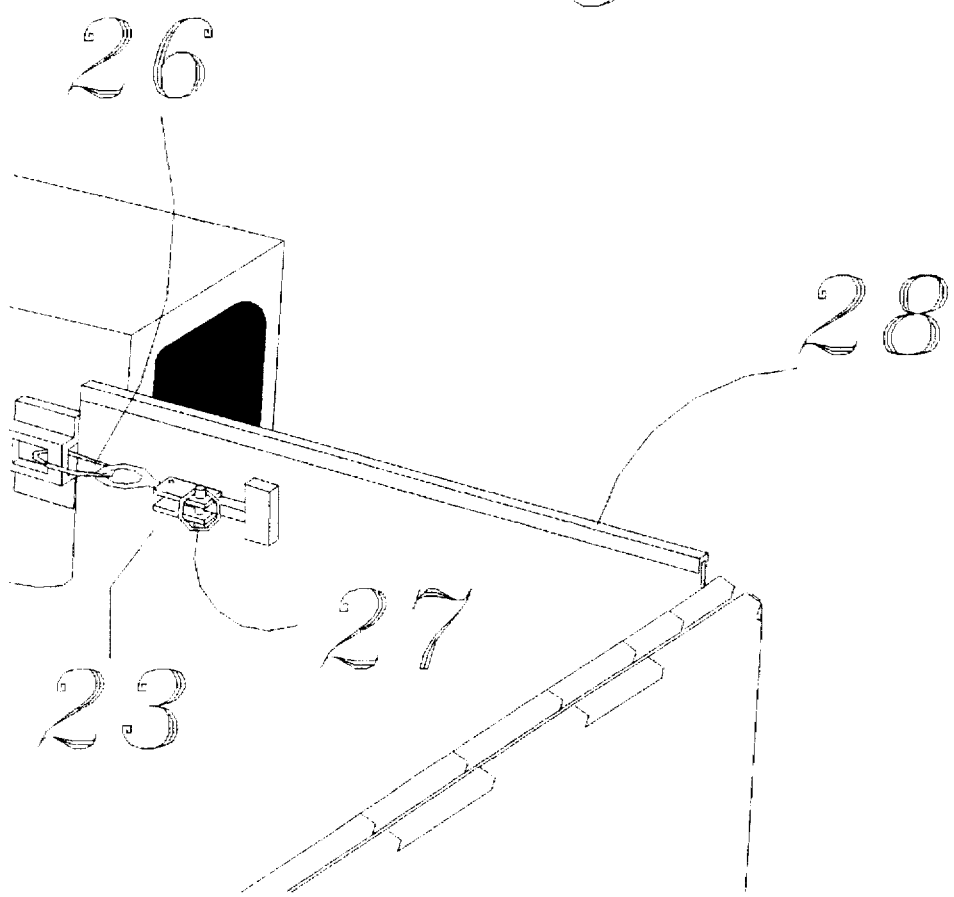
FIG. 4 is an rear-side view which shows the side bed extenders as latched to the truck bed while in the second transport position.
Figure 5:
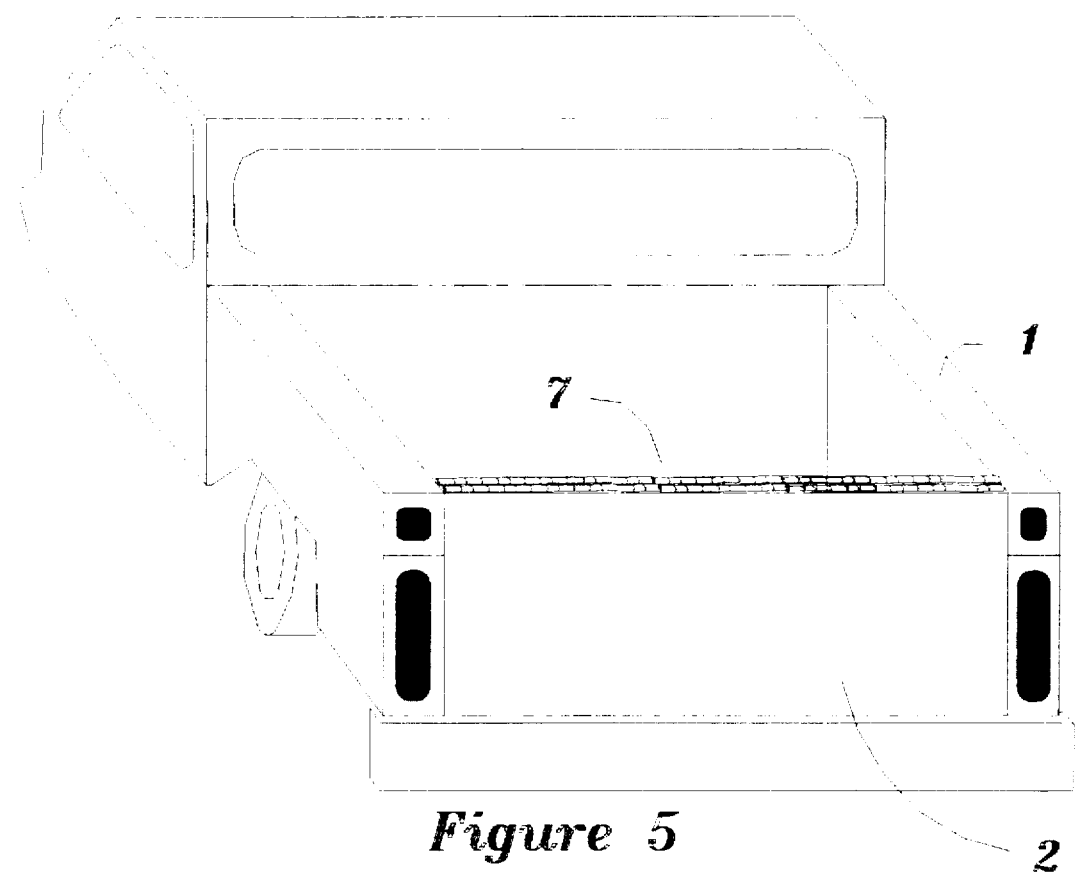
FIG. 5 is a rear-side view of the ramp/truck bed extender in the first transport position.

FIG. 5 shows a back end view of a truck bed 1 with the folding ramp in the first transport (collapsed) position with the tailgate 2 in the closed position. FIG. 2 shows the mounting plate 3 which is removably mounted upon the tailgate 2 by conventional nuts and bolts to inside surface of the tailgate which partially defines the inside of the truck bed when closed. The extension plate 22 is hingably connected to the mounting plate 3, first foldable section 4 is hingably connected to the extension plate 22, the second foldable section 5 is hingably connected to the first foldable section 4, and the third foldable section 6 is hingably connected to the second foldable section 5. The side bed extenders 9 are hingably connected to each outer edge of the extension plate 22 (FIGS. 1 and 2). FIG. 2 shows the side bed extenders 9 in the loading position where FIG. 1 shows them in the folded position between the extension plate 22 and the tailgate 2. FIG. 4 shows a protective molding 28 installed upon the exposed edge of each side bed extender 9.

Figure 3:
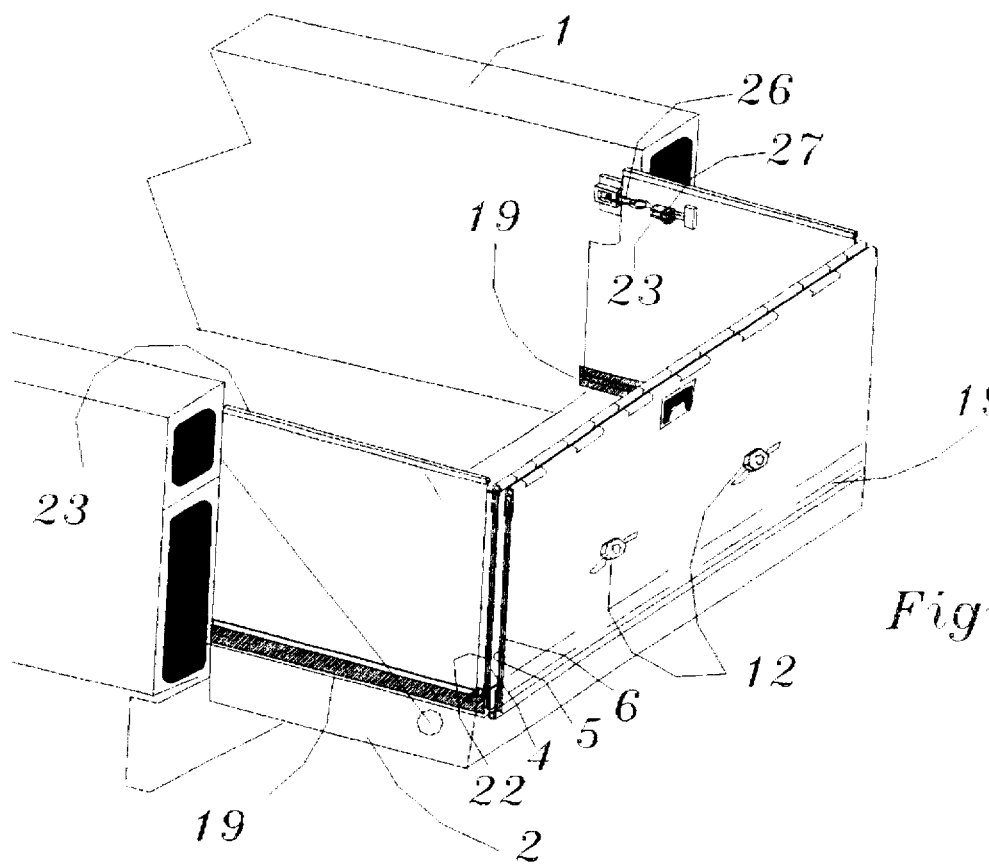
FIG. 3 is a rear-side view of the ramp/truck bed extender in the second transport position.

FIG. 5 shows the ramp in the first transport position. In order to extend the ramp to the loading position from the first transport position, the tailgate 2 must first be lowered to its open position as illustrated in FIG. 1. If the ramp is instead in the second transport position as illustrated in FIG. 3, the side bed extender latches 23 are released from the sides of the truck bed thereby enabling the extension plate 22 to be hingably swung outward to its extended position as shown in FIG. 2.

In FIG. 2, two or more ramp supports 10 (which are each comprised of a ramp support bracket 17 affixed to a standard two by four board cut to a predetermined length) are then positioned in a predetermined manner across the width of the rear tailgate 2 edge. Although this figure shows the ramp supports constructed from wood and a metal bracket, the actual make-up of each ramp could be of any suitable rigid material.

If the ramp is in the first transport position as shown in FIG. 5, one or more securing bolts 12 which extend through the extension plate 22, the first 4, second 5, and third 6 foldable sections, must be removed from their respective threaded receiving holes in the mounting plate 3 to allow the extension plate 22, the first 4, second 5, and third 6 foldable sections to be expanded to the loading position (shown in FIG. 1). If the ramp is in the second transport position, the securing bolts 12 (FIG. 1) which extend through the extension plate 22, the first 4, second 5, and third 6 foldable sections which are instead secured by conventional threaded nuts, must be removed thereby allowing the extension plate 22, the first 4, second 5, and third 6 foldable sections to be expanded to the loading position. The securing bolts 12 are further defined as bolts with winged heads 28 and a thumb operable nut 29. After each securing bolt 12 is threaded into its receiving nut, the thumb operable nut 29 is then tightened to exert a clamping force upon the ramp in relation to the tailgate 2.

Figure 6:
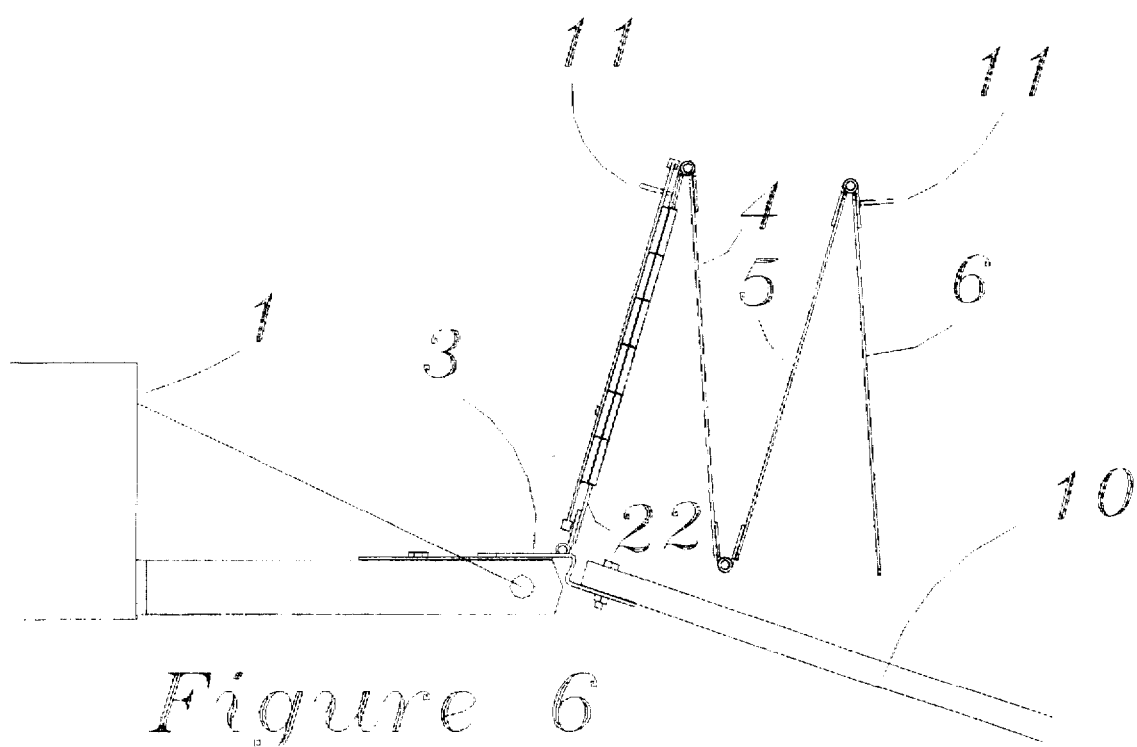
FIG. 6 is a side view of the ramp/truck bed extender as it is being expanded into the loading position.
Figure 7:
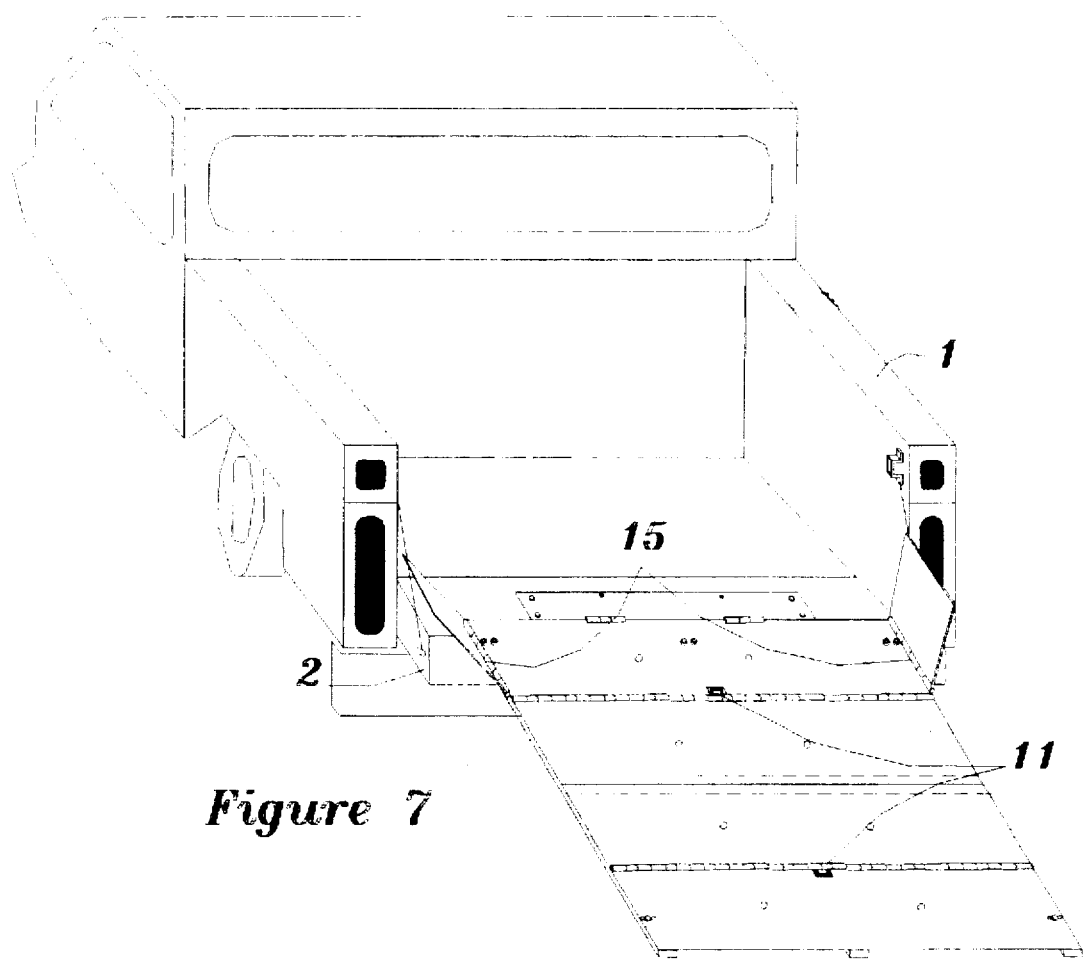
FIG. 7 is a rear view of the ramp/truck bed extender which illustrates the ramp/truck bed extender in the loading position.

With the ramp supports 10 in position and the extension plate 22 and the first 4, second 5, and third 6 foldable sections unsecured, the ramp may be extended into the loading position (FIG. 2). FIG. 6 shows the extension of the ramp in process and in particular the swingable direction of the hinges which connect: the extension plate 22, the first 4, second 5, and third 6 foldable sections. The recessed handles 11 are attached by conventional nuts and bolts to the extension plate 22 and third 6 foldable section. In order to utilize the ramp after it is extended, the side bed extenders 9, which are hingably mounted by hinges 15 upon the outer side edges of the extension plate 22, are swingably moved in an outward manner as to not to obstruct the surface of the extension plate 22 during loading (Shown in FIG. 7). The ramp is now in the fully extended position. As the last step before loading may commence, FIG. 2 shows the securing bolts 12 which are inserted through aligned holes in the ramp supports 10 and the extension plate 22 and the second foldable section 5. Once again, it is not imperative that the extension plate 22 and the second foldable section 5 contain the holes to receive the securing bolts 12. The holes could easily be located in any corresponding combination of the other members which comprise the ramp. While in place, the securing bolts 12 secure the ramp to the ramp supports 10 thereby ensuring continuous alignment of the ramp supports 10 with the ramp.

In order to stow the ramp in the first transport position, the securing bolts 12 are removed. The side bed extenders 9 are folded inward to lie directly on top of the extension plate in an opposed flat manner (shown in FIG. 2). The recessed handles 11 are simultaneously grasped and lifted in an upward and backward manner until the hinged foldable sections are collapsed in the predefined manner thereby being stacked horizontally on the open tailgate 2 (FIG. 1). The securing bolts 12 are then inserted through the extension plate 22, the first 4, second 5, and third 6 foldable sections and each secured to a threaded receiving hole in the mounting plate 3. The tailgate 2 may then be lifted to its closed position.

To stow the ramp in the second transport position, the extension plate 22 is hingably swung (with the ramp already collapsed as described above) to a position which is vertical to the open tailgate 2 (shown in FIG. 3). The securing bolts 12 are then inserted through the extension plate 22, the first 4, second 5, and third 6 foldable sections and are each secured by a conventional threaded nut. The side bed extenders 9 are then swung away from the extension plate 22 until they make contact with the sides of the truck bed. At this point the side bed extenders are fastened to the sides of the truck bed via two or more side bed extender latches 23. The lower edge of each side bed extender plate 22 incorporates a flexible seal 19 which contacts the short sides of the tailgate to provide a substantially sealed enclosure to retain those items transported within the truck bed. The securing bolts 12 which were previously removed from the ramp supports 10 are now inserted into aligned holes which extend through the upper portion of the extension plate 22, the first 4, second 5, and third 6 foldable sections. In this position, the securing bolts 12 prevent unwanted expansion of the ramp, reduced vibrational road noise, as well as a convenient storage place for said securing bolts 12. After the ramp is secured for transport, the ramp supports 10 are then removed from the tailgate 2 and stowed in the truck bed during transport.

Thus, there is been disclosed a new and improved cover for a collapsible ramp bed extender which provides a distinct advantage over previously devised collapsible ramps by serving as a collapsible ramp and an enclosed truck bed extender in the same unit.

We claimed:

1. A combination folding ramp and truck bed extender including:
   a mounting plate having a top and a bottom which is removably mounted upon a tailgate;

a extension plate having a top and a bottom being pivotably mounted to said mounting plate;

a first folding section having a top and a bottom being pivotably mounted to said extension plate;

a second folding section having a top and a bottom being pivotably mounted to said first folding section;

a third folding section having a top and a bottom being pivotably mounted to said second folding section;

a plurality of side bed extenders having a top and a bottom being pivotably mounted to said extension plate;

a plurality of latches being affixed to the top of each side bed extender thereby enabling each side bed extender to be removably attached to side portions of a truck bed.

2. A combination folding ramp and truck bed extender according to claim 1, further comprising:

a plurality of ramp support structures disposed along the bottom of said: extension plate, first folding section, second folding section, and third folding section.

3. A combination folding ramp and truck bed extender according to claim 2, further comprising:

corresponding apertures through said ramp support structures and the extension plate, first folding section, second folding section, or third folding section wherein securing bolts are positioned therein securing said sections to the ramp support structures.

4. A combination folding ramp and truck bed extender according to claim 2, further comprising:

handles affixed to the top of the extension plate and the third folding section.

5. A combination folding ramp and truck bed extender according to claim 1, further comprising:

protective molding along an exposed edge of each side bed extender.

6. A combination folding ramp and truck bed extender according to claim 1, further comprising:

a plurality of corresponding apertures through said extension plate, first folding section, second folding section, and third folding section wherein securing bolts are positioned thereby securing the ramp in a collapsed position.

7. A combination folding ramp and truck bed extender according to claim 1, wherein each latch is further defined as a snap ring, a toggle latch, and a securing pin.

* * * * *